(12) United States Patent
Kumagai et al.

(10) Patent No.: US 7,701,566 B2
(45) Date of Patent: Apr. 20, 2010

(54) SURVEYING SYSTEM

(75) Inventors: Kaoru Kumagai, Itabashi-ku (JP); Masahiro Saito, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/315,358

(22) Filed: Dec. 2, 2008

(65) Prior Publication Data
US 2009/0171618 A1 Jul. 2, 2009

(30) Foreign Application Priority Data
Dec. 27, 2007 (JP) .............................. 2007-337109

(51) Int. Cl.
*G01C 1/00* (2006.01)
(52) U.S. Cl. ................. 356/141.5; 356/5.01; 356/141.2; 356/614
(58) Field of Classification Search ................ 356/4.01, 356/5.01, 29, 139.01, 141.2, 141.5, 152.2, 356/614
See application file for complete search history.

(56) References Cited

U.S. PATENT DOCUMENTS

| | | | | |
|---|---|---|---|---|
| 5,000,564 A * | 3/1991 | Ake | ........................... | 356/3.16 |
| 5,100,229 A * | 3/1992 | Lundberg et al. | .......... | 356/3.12 |
| 6,400,452 B1 * | 6/2002 | Maynard | .................. | 356/141.1 |
| 6,519,029 B1 * | 2/2003 | Hedges et al. | ........... | 356/141.4 |
| 7,144,191 B2 * | 12/2006 | Kieranen et al. | ........... | 404/84.1 |
| 2004/0246498 A1 * | 12/2004 | Kumagai et al. | ............ | 356/614 |
| 2008/0074636 A1 * | 3/2008 | Yabe | ......................... | 356/4.01 |
| 2009/0235541 A1 * | 9/2009 | Kumagai et al. | .............. | 33/281 |

FOREIGN PATENT DOCUMENTS

| | | |
|---|---|---|
| JP | 2001-090477 | 4/2001 |
| JP | 2003-149342 | 5/2003 |
| JP | 2004-132914 | 4/2004 |

* cited by examiner

*Primary Examiner*—Isam Alsomiri
(74) *Attorney, Agent, or Firm*—Nields, Lemack & Frame, LLC (57) ABSTRACT

A surveying system, which comprises a surveying instrument 1 which measures a distance and an angle by projecting a distance measuring light toward a target 12 and can measure a three-dimensional position data of said target and has a function to track the target, and a movable side control device 12 provided on the target side, wherein said surveying instrument has a communication means 15 capable to transmit the three-dimensional position data of the target measured by the surveying instrument to said movable side control device and a first control arithmetic unit 29 for controlling the search of the target by the surveying instrument, wherein said movable side control device has a displacement amount detecting means 38 of the target and a second control arithmetic unit 35 for calculating the displacement amount of the target based on a target detection signal from the displacement amount detecting means and for calculating a target position based on the displacement amount of the target and based on the three-dimensional position data, and in case the surveying instrument cannot track the target, the target position transmitted from the movable side control device is acquired, and the first control arithmetic unit starts searching of the target with the target position as a starting point.

6 Claims, 6 Drawing Sheets

SURVEYING SYSTEM

BACKGROUND OF THE INVENTION

The present invention relates to a surveying system, in particular, to a surveying system using a surveying instrument with a tracking function.

As a surveying instrument for measuring a distance, a horizontal angle and a vertical angle, a surveying instrument provided with the tracking function has been known in the past. In this type of the surveying instrument, an object reflector (target) such as a corner cube is collimated by a collimating telescope provided on the surveying instrument. A tracking light is projected from the collimating telescope, and when the target is moved, a reflection light from the target is received and the target can be automatically tracked.

Normally, in a surveying instrument with the tracking function, no operator is assigned on the surveying instrument side, and a surveying operator works on the target side. The target is supported by the surveying operator or the target is supported on a construction machine and is moved.

In a case a moving speed of the target exceeds a following speed of the surveying instrument and the target goes out of a visual field of the collimating telescope or in case an obstacle such as a tree, a vehicle, a person, etc. temporarily comes into a space between the surveying instrument and the target, and the obstacle intercepts an optical path of the collimating telescope, the surveying instrument cannot receive a reflected light from the target, and an automatic tracking may be interrupted.

The reason for this is that, in a collimating telescope generally in use, a field angle (an angle of view) is as small as about 1° and a range to detect the reflection light for purpose of the automatic tracking is too narrow.

When the automatic tracking of the target is interrupted, the surveying instrument starts an operation to search the target. In the searching operation, the collimating telescope is rotated within a predetermined range in up-to-bottom direction and in left-to-right direction while the tracking light is projected for scanning and the target is detected.

Figure 6:
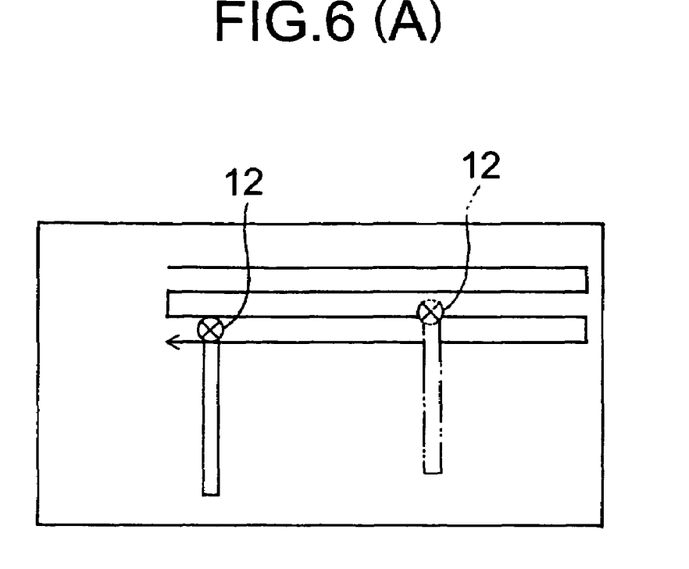

In a conventional searching method, a scanning is performed by changing an elevation angle within a range of a predetermined horizontal angle using a position detected lastly by the collimating telescope on the surveying instrument side as a reference (FIG. 6 (A)), or the scanning or the like is carried out in a spiral manner from the last detected position (FIG. 6 (B)), and the target 12, which has been missed out of sight, is detected.

As described above, the field angle of the collimating telescope is small, in order to re-detect the target, it is necessary to have a finer scanning pitch. For this reason, when the automatic tracking is interrupted, much time is required for the purpose of detecting the target again and starting the automatic tracking operation. Further, under working conditions where the optical path is frequently intercepted by the obstacle, there is a problem in that a working efficiency of the measuring operation is extremely decreased.

A surveying instrument, which has the tracking function and performs searching when the tracking operation is interrupted, is disclosed in JP-A-2004-132914.

SUMMARY OF THE INVENTION

It is an object of the present invention to provide a surveying system provided with a surveying instrument with the tracking function, by which it is possible to quickly re-detect a target when the target is missed from the sight and it is impossible to perform the automatic tracking, to reduce the time required until a restoration of the automatic tracking, and to improve an efficiency of the measuring operation.

To attain the above object, the present invention provides a surveying system, comprising a surveying instrument which measures a distance and an angle by projecting a distance measuring light toward a target and can measure a three-dimensional position data of the target and has a function to track the target, and a movable side control device provided on the target side. The surveying instrument has a communication means capable to transmit a three-dimensional position data of the target measured by the surveying instrument to the movable side control device and a first control arithmetic unit for controlling the search of the target by the surveying instrument, the movable side control device has a displacement amount detecting means of the target and a second control arithmetic unit for calculating displacement amount of the target based on a target detection signal from the displacement amount detecting means and for calculating target position based on the displacement amount of the target and based on the three-dimensional position data, and in case the surveying instrument cannot track the target, the target position transmitted from the movable side control device is acquired, and the first control arithmetic unit starts searching of the target with the target position as a starting point. Also, the present invention provides the surveying system as described above, comprising a surveying instrument which measures a distance and an angle by projecting a distance measuring light toward a target and can measure a three-dimensional position data of the target and has a function to track the target, and a movable side control device provided on the target side. The surveying instrument has a communication means capable to transmit a three-dimensional position data of the target measured by the surveying instrument to the movable side control device and a first control arithmetic unit for controlling the search of the target by the surveying instrument, the movable side control device has a displacement amount detecting means of the target and a second control arithmetic unit for calculating the displacement amount of the target based on a target detection signal from the displacement amount detecting means, and in case the surveying instrument cannot track the target, the displacement amount of the target to be transmitted from the movable side control device is acquired, the first control arithmetic unit calculates the three-dimensional position data of the target measured lastly and calculates a target position based on a displacement amount of the target and starts searching of the target with the target position as a starting point. Further, the present invention provides the surveying system as described above, wherein the displacement amount detecting means is an acceleration sensor.

The present invention provides a surveying system, comprising a surveying instrument which measures a distance and an angle by projecting a distance measuring light toward a target can measure a three-dimensional position data of the target and has a function to track the target, and a movable side control device provided on the target side. The surveying instrument has a communication means capable to transmit a three-dimensional position data of the target measured by the surveying instrument to the movable side control device and a first control arithmetic unit for controlling the search of the target by the surveying instrument, the movable side control device has a displacement amount detecting means of the target and a second control arithmetic unit for calculating displacement amount of the target based on a target detection signal from the displacement amount detecting means and for calculating target position based on the displacement amount of the target and based on the three-dimensional position data, and in case the surveying instrument cannot track the target, the target position transmitted from the movable side control device is acquired, and the first control arithmetic unit starts searching of the target with the target position as a starting point. The target position thus obtained is the current position of the target or it is a position very close to the current position of the target. As a result, the target can be detected within a minimum searching range, and the tracking operation can be started promptly.

Also, the present invention provides the surveying system as described above, comprising a surveying instrument which measures a distance and an angle by projecting a distance measuring light toward a target and can measure a three-dimensional position data of the target and has a function to track the target, and a movable side control device provided on the target side. The surveying instrument has a communication means capable to transmit a three-dimensional position data of the target measured by the surveying instrument to the movable side control device and a first control arithmetic unit for controlling the search of the target by the surveying instrument, the movable side control device has a displacement amount detecting means of the target and a second control arithmetic unit for calculating displacement amount of the target based on a target detection signal from the displacement amount detecting means, and in case the surveying instrument cannot track the target, the displacement amount of the target to be transmitted from the movable side control device is acquired, the first control arithmetic unit calculates a target position based on the three-dimensional position data of the target measured lastly and based on a displacement amount of the target and starts searching of the target with the target position as a starting point. The target position thus obtained is the current position of the target or it is a position very close to the current position of the target. As a result, the target can be detected within a minimum searching range, and the tracking operation can be started promptly.

Further, according to the present invention, the displacement amount detecting means is an acceleration sensor, and the displacement amount detecting means can be provided by using a low-cost detector.

BRIEF DESCRIPTION OF THE DRAWINGS

FIG. 6 (A) and FIG. 6 (B) each represents an aspect of searching when the surveying instrument misses a target.

DETAILED DESCRIPTION OF THE PREFERRED EMBODIMENT

A description will be given below on the best aspect for carrying out the present invention by referring to the attached drawings.

First, referring to FIG. 1 to FIG. 3, a description will be given on general features of the surveying system, to which the present invention is applied.

Figure 1:
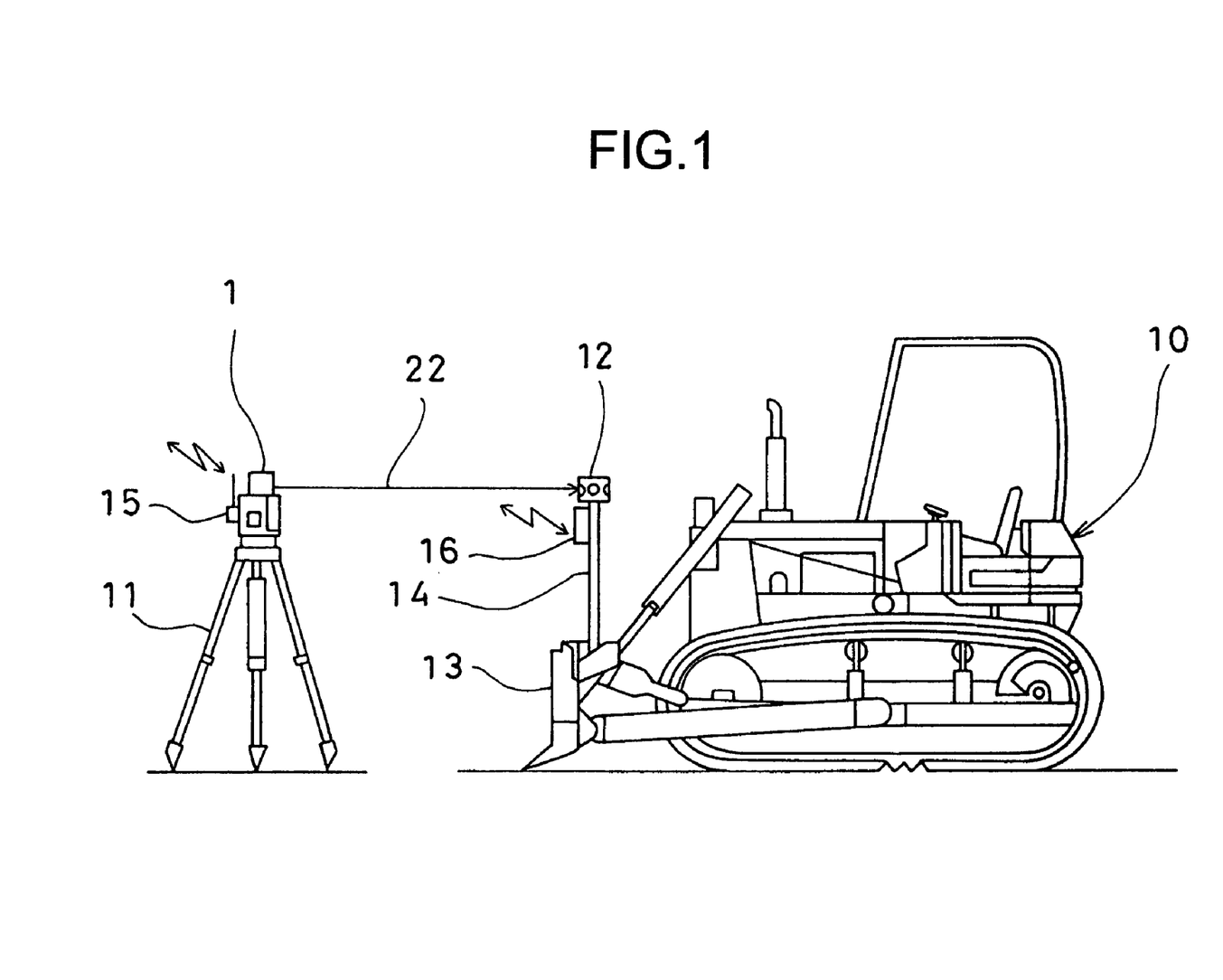
FIG. 1 is a schematical drawing to show an example of a surveying system according to an embodiment of the present invention.

FIG. 1 shows an example of a surveying system according to the present invention. The figure represents a case where the present invention is applied to civil engineering work using a construction machine 10, e.g. a bulldozer.

A surveying instrument 1 is installed at a known point via a tripod 11. A target 12 and a movable side control device 16 are installed on a pole 14, which is erected on a bulldozer blade (soil-pushing blade) 13.

Figure 2:
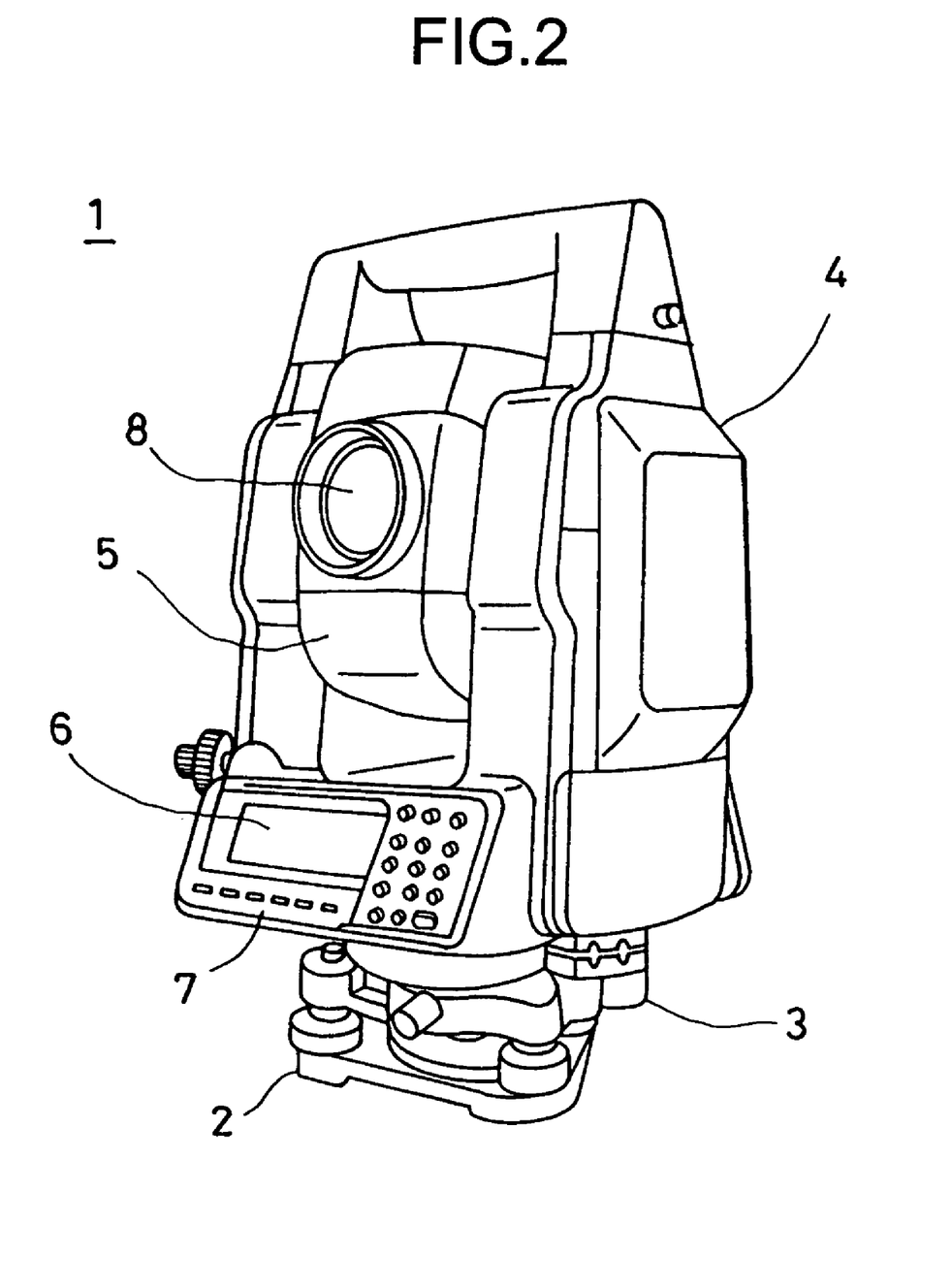
FIG. 2 is a perspective view of an example of a surveying instrument used in the surveying system.
Figure 3:
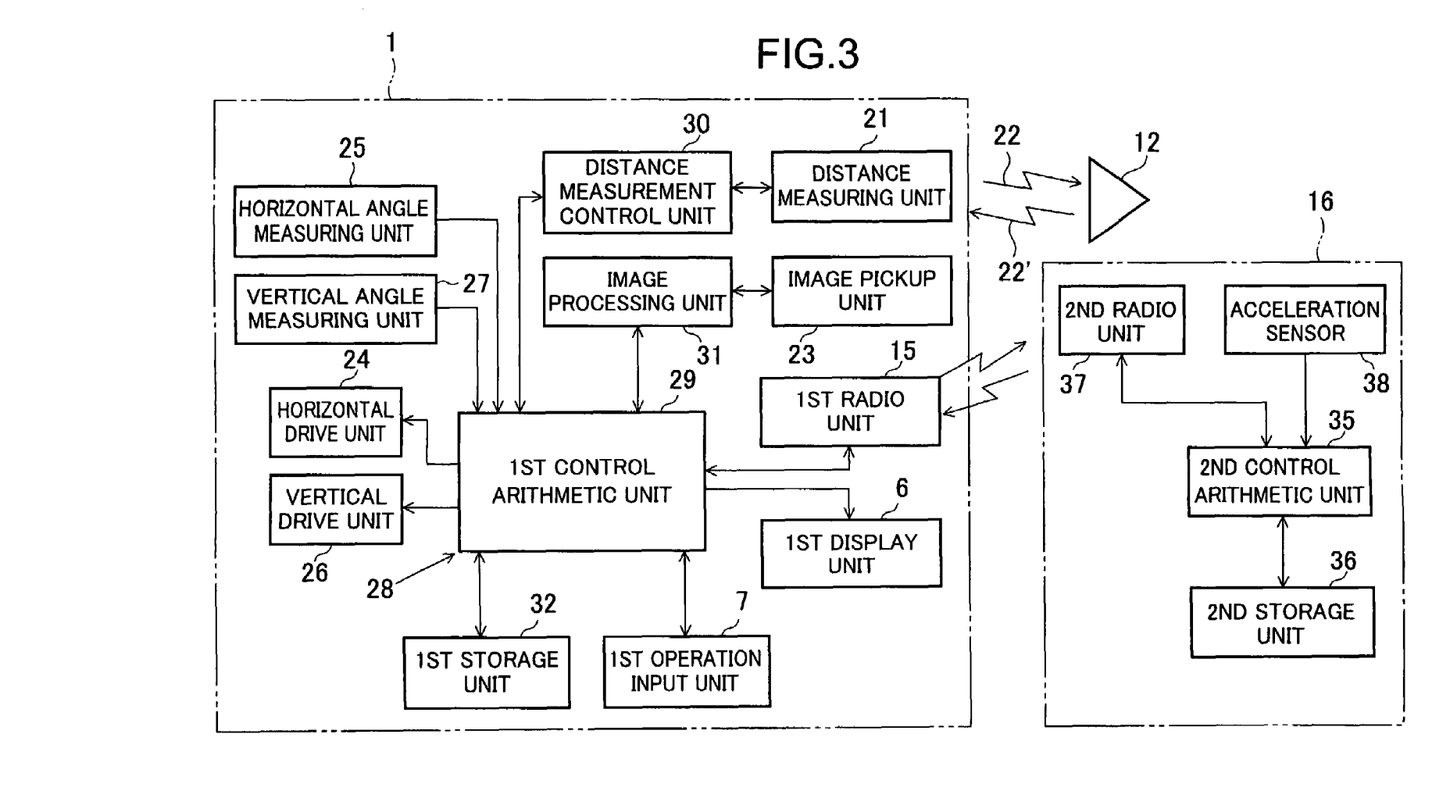
FIG. 3 is a block diagram to show general features of the embodiment of the invention.

FIG. 2 shows the surveying instrument 1, to which the present invention is applied. The surveying instrument 1 used is a total station, for instance. A pulsed laser beam is projected to a measuring point. A pulsed reflection light from the measuring point is received, and a distance is measured for each pulse. The results of a distance measurement are averaged, and the distance measurement is performed with high accuracy.

The surveying instrument 1 primarily comprises a leveling unit 2 installed on a tripod 11 (FIG. 1), a base unit 3 mounted on the leveling unit 2, a frame unit 4 rotatably mounted on the base unit 3 around a vertical axis, and a telescope unit 5 rotatably mounted on the frame unit 4 around a horizontal axis.

The frame unit 4 comprises a first display unit 6 and a first operation input unit 7. The telescope unit 5 is provided with a telescope 8 for collimating an object to be measured and also has a distance measuring unit 21 (to be described later), which commonly shares an optical system with the telescope 8.

The surveying instrument 1 is provided with a first radio unit 15 as communication means. A distance to the target 12, and a horizontal angle and a vertical angle of the target 12 are measured by the surveying instrument 1. Then, measurement data (three-dimensional position data) such as a measured distance and a measured angle obtained by the measurement are transmitted to the target 12 side by radio communication means.

A movable side control device 16 is installed on the target 12 side. The movable side control device 16 is mounted on the pole 14 or is disposed on the construction machine 10. (In FIG. 1, it is mounted on the pole 14.).

The movable side control device 16 has a communication unit for performing data communication to and from the surveying instrument 1. It is also provided with position measuring means for determining a moving direction and a moved distance of the target 12 based on the three-dimensional position data received from the surveying instrument 1.

Now, referring to FIG. 3, a description will be given on an approximate arrangement of the surveying system according to the present invention.

The surveying system primarily comprises the surveying instrument 1, the target 12 and the movable side control device 16.

First, the surveying instrument 1 will be described.

The telescope unit 5 is incorporated with a distance measuring unit 21 having a distance measuring light optical system, and the distance measuring unit 21 projects a distance measuring light 22 and receives a reflection light 22' from the target 12. Thus, an electro-optical (light wave) distance measurement to the target 12 can be carried out. Further, the telescope unit 5 has an image pickup unit 23 in which the distance measuring optical system is used and common optical system.

The frame unit 4 is provided with a horizontal drive unit 24 for rotating the frame unit 4 in horizontal direction. It is also provided with a horizontal angle measuring unit 25, which detects a horizontal rotation angle of the frame unit 4 with respect to the base unit 3 and also detects a horizontal angle in collimating direction. Also, the frame unit 4 is provided with a vertical drive unit 26 for rotating the telescope unit 5 around the horizontal axis, and the frame unit 4 is also provided with a vertical angle measuring unit 27, which detects a vertical angle of the telescope unit 5 and measures a vertical angle in collimating direction. The distance measuring unit 21, the horizontal angle measuring unit 25 and the vertical angle measuring unit 27 make up together a measuring unit.

The frame unit 4 is incorporated with a control device 28. By controlling drivings of the horizontal drive unit 24 and the vertical drive unit 26, the control device 28 rotates the frame unit 4, the telescope unit 5, and collimates the telescope unit 5 in predetermined direction, and scans the light over a predetermined range. Further, the control device 28 switches over optical magnification of the telescope 8 or acquires an image in collimating direction by the image pickup unit 23. Further, by controlling the changeover of an electrically processed magnification of the acquired image, an image with the magnification as required is acquired. Also, by controlling the distance measuring unit 21, a distance to the target 12 is measured.

The first control arithmetic unit 29 judges whether the distance measuring unit 21 is received the reflection light 22' from the target 12 and is being measured a distance or not, i.e. whether the tracking operation is performed or not.

The image pickup unit 23 has a photodetection element (not shown). The photodetection element is an aggregate of pixels, for instance, CCD, CMOS, etc. A position of a pixel to receive the light can be identified. An image processing unit 31 determines field angle of the pixel based on a signal from the pixel and further calculates a position of the target 12.

The control device 28 primarily comprises a first control arithmetic unit 29, a distance measurement control unit 30, the image processing unit 31, a first storage unit 32, the first display unit 6, the first operation input unit 7, the first radio unit 15, etc.

The results of the measurement from the distance measuring unit 21, the horizontal angle measuring unit 25, and the vertical angle measuring unit 27 are inputted to the first control arithmetic unit 29, and a distance, a horizontal angle and a vertical angle are measured. The measurement data (the three-dimensional position data) thus obtained are stored in the first storage unit 32 via the first control arithmetic unit 29 and are displayed on the first display unit 6. Based on a signal from the image processing unit 31, the first control arithmetic unit 29 performs tracking the target by driving the horizontal drive unit 24 and the vertical drive unit 26 so that the target 12 will be at a center of a collimation and the first control arithmetic unit 29 measures the distance by controlling the distance measurement control unit 30.

The results of a judgment as to whether the target is being tracked or not and the measurement data are transmitted from the first radio unit 15 to the movable side control device 16.

The first storage unit 32 has a program storage area for storing various programs and a data storage area where data such as the measurement results are stored. In the program storage area, the following programs are stored: A calculation program necessary for the measurement, an image processing program for detecting a position of the target 12 by the image processing as to be described later, a sequence program for tracking a measuring point (target), a search program for searching the target 12 in case the target 12 is missed out of sight when the measurement is started, an image display program for displaying an image on the first display unit 6, a communication program for performing communication to and from the movable side control device 16, and other programs.

Next, a description will be given on the movable side control device 16.

The movable side control device 16 primarily comprises a second control arithmetic unit 35, a second storage unit 36, a second radio unit 37, a displacement amount detecting means 38, etc.

In the second storage unit 36, various programs are stored. These programs include: a communication program for performing communication to and from the surveying instrument 1 and a position calculating program for calculating a moving direction and a moved distance based on a signal from the displacement amount detecting means 38. The second storage unit 36 has a data storage area on a part of the second storage unit 36. In the data storage area, the measurement data transmitted from the surveying instrument 1 and a position data of the target 12 calculated by the position calculating program are stored.

The displacement amount detecting means 38 is an acceleration sensor, for instance, and acceleration on the target 12 is detected. Based on an acceleration signal from the displacement amount detecting means 38, the second control arithmetic unit 35 integrates the acceleration, and calculates a speed and a distance. Then, the moving direction and the moved distance are calculated from a predetermined time point and the results of calculation are stored in the second storage unit 36.

The second radio unit 37 receives the three-dimensional position data of the target 12 transmitted from the surveying instrument 1, and the received data are stored in the second storage unit 36.

Figure 4:
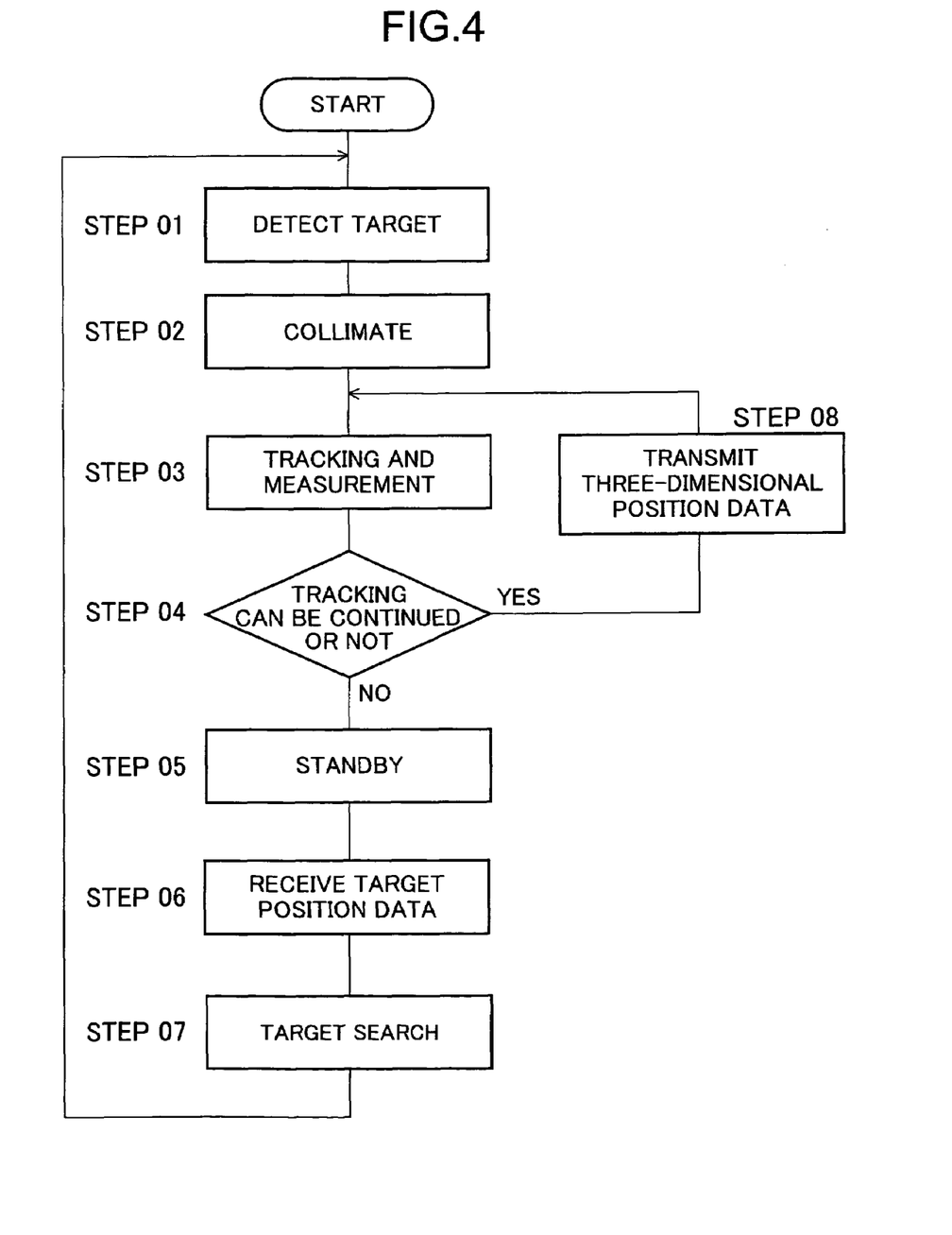
FIG. 4 is a flow chart to show operation of the embodiment of the invention.
Figure 5:
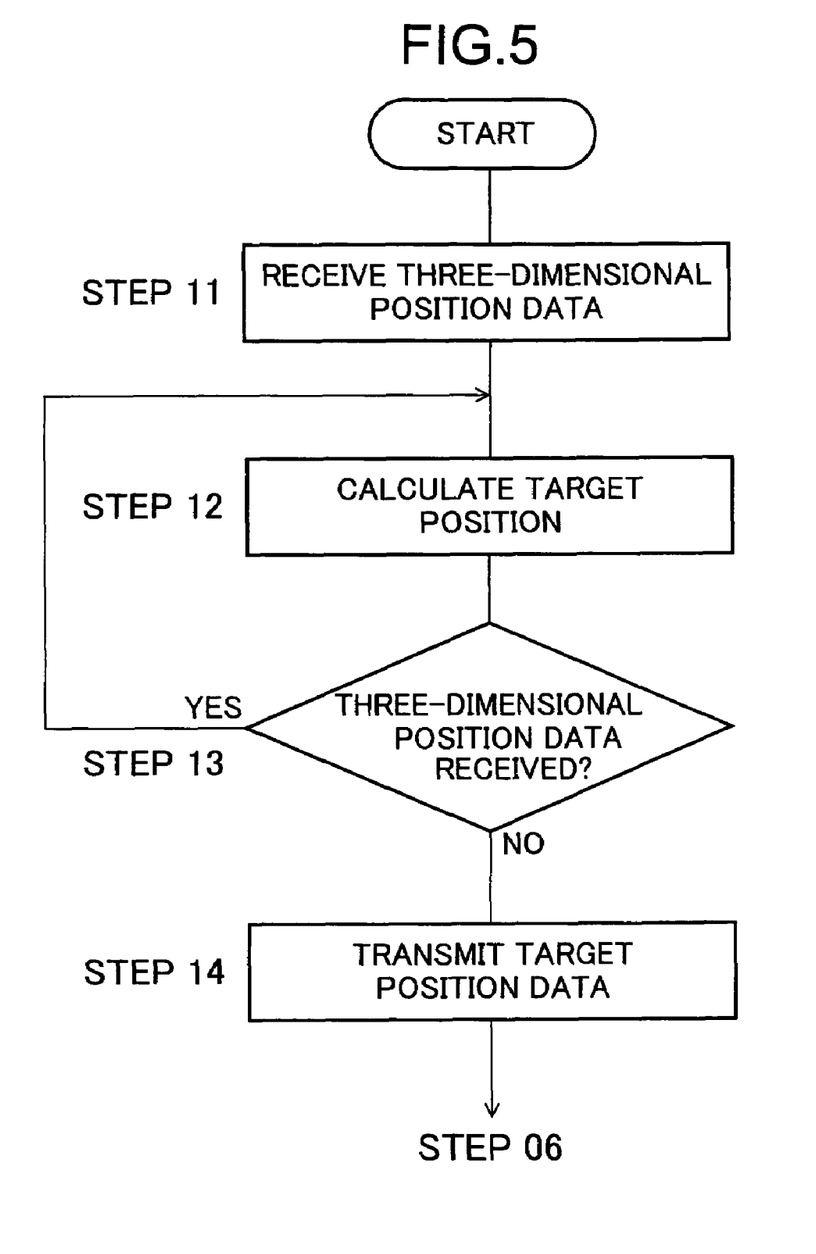
FIG. 5 is a flow chart to show operation of the embodiment of the invention.

Now, referring to FIG. 4 and FIG. 5, a description will be given on operation according to the present invention. FIG. 4 shows a sequence of the surveying instrument 1, and FIG. 5 shows a sequence of the target 12 and the movable side control device 16.

The target 12 is installed at a measuring point, and power to the measuring device 1 is turned on.

First, a description will be given on operation of the surveying instrument 1.

(Step 01) By the telescope 8, the target 12 is caught within a range where the tracking can be made. An image of the target 12 is received by the image pickup unit 23.

(Step 02) Based on the image of the target 12, a target position is determined by the image processing unit 31, and the telescope 8 is collimated to the target 12.

(Step 03) When the telescope 8 is collimated to the target 12, a distance, a horizontal angle and a vertical angle are measured, and the three-dimensional position data of the target 12 can be obtained. The tracking operation is carried out, and the measurement is continued. The three-dimensional position data of the target 12 are transmitted to the movable side control device 16 via the first radio unit 15 at an interval time, for instance, at an interval of 0.1 second or 0.05 second.

(Step 04) In case the reflection light 22' from the target 12 is interrupted or deterred or in case a reflection light from an object other than the target 12 enters, or in other case, it is judged whether the tracking operation can be continued or not. If it is possible to continue, the tracking operation will be continued, and the three-dimensional position data are transmitted to the movable side control device 16 (Step 08).

(Step 05) In case it is impossible to track, i.e. in case the three-dimensional position data cannot be transmitted, the surveying instrument 1 is turned to a standby state, and it waits for transmission of the target position data from the movable side control device 16.

(Step 06 and Step 07) When the target position data is received from the movable side control device 16, searching of the target 12 is started with the position data as a starting point. As an aspect for searching, an aspect shown in FIG. 6(A) or FIG. 6(B), or any aspect can be adopted.

The position of the target to be received is a position obtained by correcting the last position of the target, which could not be tracked, by the movable side control device 16. The missed target is considered to be near the target position received. Searching distance and searching range can be reduced to the minimum, and the target 12 can be detected within short time.

When the target 12 is detected in Step 02 as given above, the procedures of Step 03 and the subsequent steps are repeatedly carried out.

Next, a description will be given on operations of the target 12 and the movable side control device 16.

(Step 11) The measurement is started, and the results of the measurement of the target 12, i.e. the three-dimensional position data of the target 12, are transmitted from the surveying instrument 1 at a predetermined time interval, and the second radio unit 37 receives the three-dimensional position data.

(Step 12) The three-dimensional position data thus received is stored in the second storage unit 36. Further, an acceleration signal is continuously inputted from the displacement amount detecting means 38. Based on the acceleration signal, the second control arithmetic unit 35 calculates a direction and a distance (a moved distance) from the moment when the three-dimensional position data was received. Then, the moved distance is added to the three-dimensional position data, and the three-dimensional position data of the target 12 is calculated at real time. The calculation of the moved distance is continuously performed until the next three-dimensional position data is received. At the moment when the next three-dimensional position data has been received, the calculation of the moved distance is re-started, and the moved distance calculated previously and the three-dimensional position data received are rewritten.

(Step 13) When the three-dimensional position data has been received from the surveying instrument 1 within a predetermined time period, the second radio unit 37 outputs a signal "data received" to the second control arithmetic unit 35, and the second control arithmetic unit 35 judges whether the three-dimensional position data has been received or not within the predetermined time period.

In case it is judged that the three-dimensional position data has been received within the predetermined time period, it is judged that the tracking operation is being continued, and based on the three-dimensional position data received and the signal from the displacement amount detecting means 38, the present position of the target 12 (target position data) is calculated (Step 12).

(Step 14) In case it is judged that the three-dimensional position data has not been received within the predetermined time period, the three-dimensional position data of the target 12 as calculated lastly is called from the second storage unit 36, and the target position data of the target 12 is transmitted to the surveying instrument 1 via the second radio unit 37.

As described above, when the surveying instrument 1 receives the target position data of the target 12, searching is started with the target position data of the target 12 as a reference (Step 06 and Step 07).

In the embodiment as described above, the target 12 and the movable side control device 16 are installed on a construction machine, while it is needless to say that the target 12 and the movable side control device 16 may also be installed on a pole supported by a surveying operator and the operator may move the pole.

In the above, the acceleration sensor is used as the displacement amount detecting means 38, while gyro, motion sensor, GPS position detecting device, etc. may be used.

The judgment that the surveying instrument 1 missed the target 12 may be made on the movable side control device 16. In case the three dimensional position data from the surveying instrument 1 is not received for a predetermined time period, it may be judged that it is impossible to track the target. Further, the target position data from the movable side control device 16 to the surveying instrument 1 may be transmitted to the surveying instrument 1 by using the judgment of the movable side control device 16 on a state where the tracking is impossible as a trigger, or a transmission may be made by requesting the target position data to the movable side control device 16 when the surveying instrument 1 judges that it is impossible to track.

Also, the judgment that the surveying instrument 1 missed the target 12 may be made when the surveying instrument 1, i.e. the distance measuring unit, cannot receive the reflection light 22' from the target 12 or when the distance measurement on the target 12 cannot be carried out. Further, it may judged that the target is missed when an image of the target 12 received at the image pickup unit 23 is deviated from the range where the tracking can be made.

Further, it may be so designed that the movable side control device 16 calculates only the moving direction and the displacement amount of the target 12 based on a signal from the displacement amount detecting means 38, and when the surveying instrument 1 cannot track the target, the moving direction and the displacement amount are transmitted to the surveying instrument 1. Then, the surveying instrument 1 may calculate the current position of the target 12 by the moving direction and a moved distance of the target 12 thus received and by the three-dimensional position data of the target 12 as measured lastly, and may start the searching the target with the position of the target 12 obtained by calculation as a starting point.

Further, the communication means may be any of a radio communication means or an optical communication means.

What is claimed is:

1. A surveying system, comprising a surveying instrument which measures a distance and an angle by projecting a distance measuring light toward a target and capable to measure a three-dimensional position data of said target and has a function to track said target, and a movable side control device provided on said target side, wherein said surveying instrument has a first communication means capable to transmit the three-dimensional position data of said target measured by said surveying instrument to said movable side control device and a first control arithmetic unit for controlling the search of said target by said surveying instrument, wherein said movable side control device has a displacement amount detecting means of said target and a second control arithmetic unit for calculating the displacement amount of said target based on a target detection signal from said displacement amount detecting means and for calculating a target position based on said displacement amount of said target and based on said three-dimensional position data, and a second communicating means, and wherein in case said surveying instrument cannot track said target, said target position transmitted from said movable side control device is acquired, and said first control arithmetic unit starts searching of said target with said target position as a starting point.

2. A surveying system, comprising a surveying instrument which measures a distance and an angle by projecting a distance measuring light toward a target and capable to measure a three-dimensional position data of said, target and has a function to track said target, and a movable side control device provided on said target side, wherein said surveying instrument has a communication means capable to transmit the three-dimensional position data of said target measured by said surveying instrument to said movable side control device and a first control arithmetic unit for controlling the search of said target by said surveying instrument, wherein said movable side control device has a displacement amount detecting means of said target and a second control arithmetic unit for calculating the displacement amount of said target based on a target detection signal from said displacement amount detecting means, and a second communicating means, and wherein in case said surveying instrument cannot track said target, the displacement amount of said target to be transmitted from said movable side control device is acquired, said first control arithmetic unit calculates the three-dimensional position data of said target measured lastly and calculates a target position based on a displacement amount of said target and starts searching said target with said target position as a starting point.

3. A surveying system according to claim 1 or 2, wherein said displacement amount detecting means is an acceleration sensor.

4. A surveying system according to claim 1 or 2, wherein a judgment that tracking is impossible is made when a distance measuring unit cannot receive a reflection light from a target.

5. A surveying system according to claim 1 or 2, wherein a range where the tracking can be made is set up at said image pickup unit, and a judgment that the tracking is impossible is made when an image of the target received at said image pickup unit is deviated from said range.

6. A method for searching a target in a surveying system, wherein said system comprises a surveying instrument which measures a distance and an angle by projecting a distance measuring light toward a target and can measure a three-dimensional position data of said target and has a function to track said target, and a movable side control device provided on said target side and has a displacement amount of detecting means, comprising a step of estimating a current position of said target based on the three-dimensional position data of said target at the moment when the tracking has become impossible and based on a displacement amount at the moment when the tracking has become impossible, and a step of starting the search with said estimated position as a starting point.

* * * * *